May 13, 1924.
H. F. CARPENTER
AUTOMATIC ELECTRIC GENERATING SYSTEM
Filed July 29, 1920
1,493,733
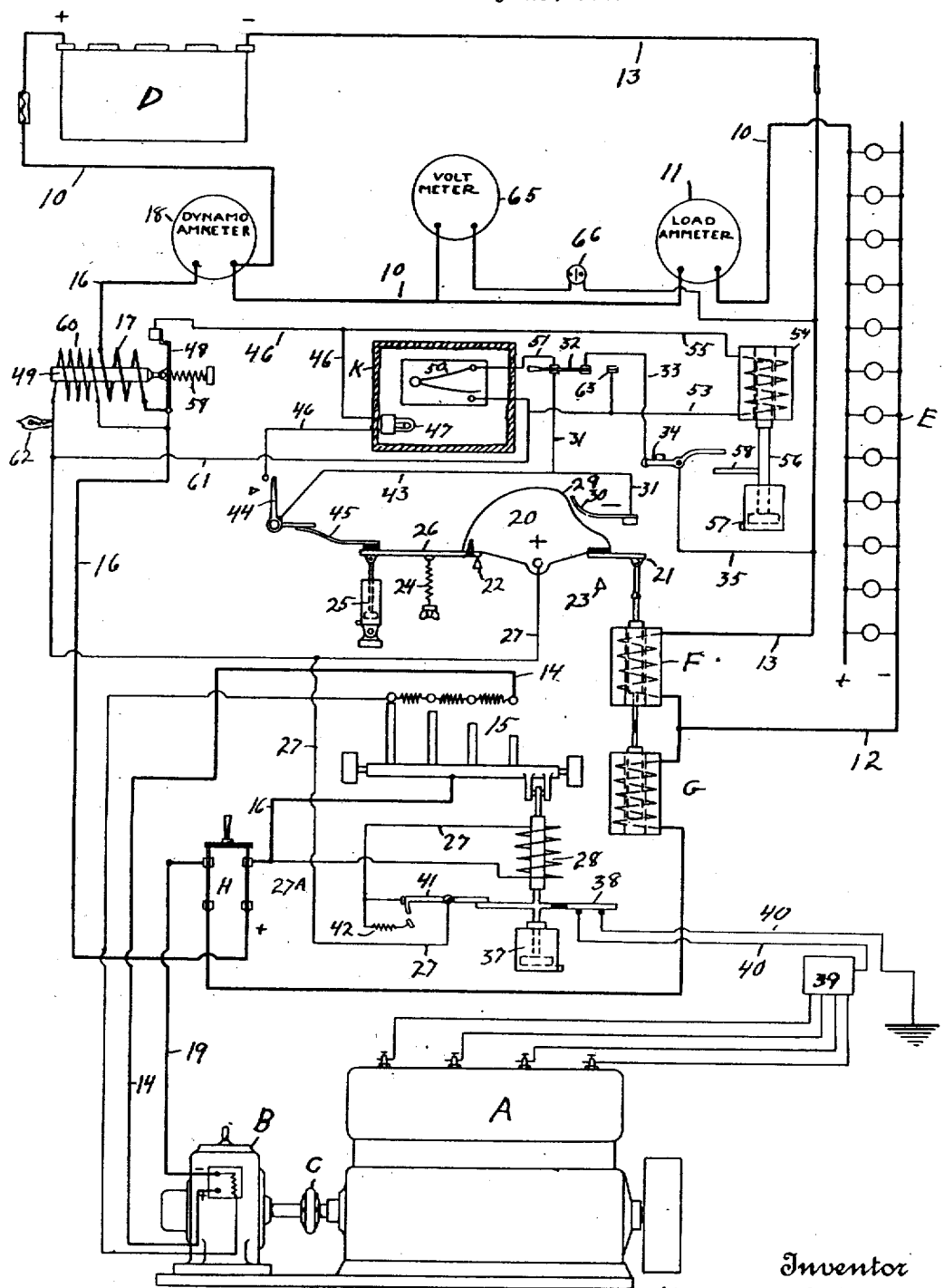
Inventor
Howard F. Carpenter
By his Attorney
C. W. Fairbank Patented May 13, 1924.

1,493,733

UNITED STATES PATENT OFFICE.

HOWARD FIELD CARPENTER, OF NEW YORK, N. Y.

AUTOMATIC ELECTRIC GENERATING SYSTEM.

Application filed July 29, 1920. Serial No. 399,789.

*To all whom it may concern:*

Be it known that I, HOWARD FIELD CARPENTER, a citizen of the United States, and a resident of New York city, in the county of New York and State of New York, have invented certain new and useful Improvements in an Automatic Electric Generating System, of which the following is a specification.

In carrying out my invention I use an internal combustion engine, directly connected to an electro-magnetic machine, an electric storage battery or accumulator, and an automatic rheostat or controller, all of any ordinary make and serving their usual functions in apparatus or systems of the character to which my invention relates. In connection with these, I provide means which will render the apparatus simple, positive and automatic, and at all times safeguard and prevent the battery from reaching such a low condition of discharge that it would be too weak to crank the engine through the electro-magnetic machine.

In other apparatus, heretofore employed or suggested, it has been attempted to secure an automatic control regulated by the voltage or E. M. F. of the load and the battery, i. e., a relay or switch that has contact points held open or closed by a predetermined high or low voltage on either the load line or battery, and closing or opening by spring or otherwise when the load reached a certain amount or the battery was discharged to a certain point or both.

While this method or system has resulted in successfully starting or stopping the generating machinery, in practice it has worked out to the detriment of the battery and the ultimate collapse of the automatic system. Hand operation has then become necessary to again get it back to automatic functioning. This is attended by trouble, delay, expense and an additional consumption of both time and fuel. In these old systems the automatic starting mechanism does not work until there is a predetermined fall in battery voltage through using the battery current on a load. When this degree of weakness on the part of the battery is reached, the automatic mechanism functions and the battery motors the electro-magnetic machine and engine into action, but directly the voltage on the charging line rises, the automatic mechanism is opened and the generating machinery is stopped, therefore the battery has not been recharged to as complete a point as it was when the cycle of discharge was begun and it requires a much shorter period of discharge on the load to again start the charging mechanism and so on down the curve line until the battery is too far exhausted to start the generating machinery. The machinery must then be cranked by hand and a long charge given the battery to bring it back to its required strength.

The ampere hour meter has been employed in the automatic starting and stopping of an electric generating machine in combination with a battery, but such a system will maintain the charging current only and until the number of amperes, equal to the number withdrawn has been returned, thus the loss due to battery inefficiency between charge and discharge has not been made up and the resultant drop on the curve line is obvious. Practice has also proven the ampere hour meter unreliable as it is frail in contact making and not sufficiently rugged to properly function under varying conditions.

A storage battery or accumulator sets up a counter E. M. F. to the charging or impressed E. M. F. in proportion to the degree of charge, and therefore at full discharge there is a minimum counter E. M. F. for a given charging or impressed E. M. F. The charging rate automatically drops as the cell voltage rises, until the battery is fully charged.

In my apparatus I take advantage of this fact and control the automatic starting and stopping mechanism by the number of amperes of current flowing through two actuating solenoid coils of proper windings, one or both of said coils being in series with the load, starting or charging current, at all times.

When the load, while on the battery only, exceeds a predetermined flow, one of the solenoids automatically switches the electro-magnetic machine on the battery. The current from the battery to the electro-magnetic machine then passes through the second solenoid and both solenoids are in series with the starting current and the combined pull of both is on the self-starting mechanism. When the electro-magnetic machine has motored the engine to speed and the engine begins its function as such, the battery takes current from the electro-magnetic machine, now acting as a generator, and the charging current therefrom passes through the two aforementioned solenoids and the combined pull on the iron cores thereof due to the current flow to the battery or the load, or both, keep the charging machinery in operation until the batteries are charged or the load is reduced to the predetermined point, or both, at which time the charging machine will stop.

The load, other than the battery, during this time is carried direct from the generator and this load current flows through one of the aforementioned solenoids and therefore combines with the battery in holding the generating machinery in operation. If sufficient load is on the load circuit, the generator would be kept running even after the battery charging current was reduced to the minimum amperage, or if the load be reduced to a minimum, or cut off entirely, the generator will keep running until the battery is fully charged. Therefore my apparatus not only functions to start the generating machinery when the load on the battery is of sufficient amperage, but it will continue such generation of current until the battery is fully charged and the load reduced to the point where the battery can carry it without becoming too greatly discharged.

To accomplish this I provide as an important feature of my invention, a circuit closing and opening mechanism which is actuated by the number of amperes flowing through one or both of said solenoid coils and which together with other important features of my invention will be pointed out more particularly hereinafter.

In the accompanying drawings I have illustrated somewhat diagrammatically a circuit and operating parts designed for carrying out my invention. The main parts of the apparatus include an internal combustion engine A of any desired make or kind and adapted to operate an electro-magnetic machine B so that the latter will act as a generator for carrying the load or charging the battery. This electro-magnetic machine is preferably shunt wound and is of such a character that when current is delivered thereto from the battery it will serve as a motor to crank or start the engine. The increased engine speed which takes place when the engine starts its normal cycle of operations causes the electro-magnetic machine to cease to act as a motor and begin acting as a generator. The engine A and motor generator B may be connected in any suitable manner, as for instance by a coupling C.

The system also includes a battery D which is of the storage battery type and is of such size and voltage as to properly adapt it for the conditions of use. The load is indicated diagrammatically as a lamp bank E.

The main circuits for battery charging, engine starting and load carrying by the generator or the battery include a wire 10 from the positive pole of the battery to one side of the load, a wire 12 from the other side of the load through the solenoid coil F, and wire 13 back to the negative pole of the battery. An ammeter 11 is preferably employed in the wire 10 to indicate the flow of all current to the load.

The generator, when generating current, delivers through a wire 14, rheostat 15, main double pole switch H and wire 16 to the wire 10. This wire 16 may include a coil 17, the function of which will be set forth hereinafter, and an ammeter 18 for indicating the flow of current to or from the motor or generator. The opposite pole of the electro-magnetic machine is connected through a wire 19 and solenoid coil G to the wire 12 and thence to the load. This wire 19 may include one blade of the double blade switch H.

When the engine and generator are at rest and the battery is carrying a very small load the main circuit is as follows, from battery through wire 10, ammeter 11, load E, wire 12, coil F, and wire 13 to the battery. When the electro-magnetic machine is acting as a motor to start the engine the flow of current is as follows:—from battery D through wire 10, ammeter 18, coil 17, wire 16, blade of switch H, rheostat 15, wire 14, motor B, wire 19, blade of switch H, coil G, coil F, and wire 13 back to battery. When the engine is running and the electro-magnetic machine B is acting as a generator to charge the battery and without carrying any load, the circuit is the reverse of that last above traced. When the battery is fully charged and the load is being carried by the generator, the flow of current from the generator is through wire 14, rheostat 15, blade of switch H, wire 16, coil 17, ammeter 18, wire 10 including ammeter 11, to load E, thence through wire 12, coil G and wire 19 including blade of switch H, back to the negative pole of the generator. These circuits hereinabove traced are very similar to others which have heretofore been used for the same general purpose except as regards the solenoid coils F and G. It will be noted that one of these is in circuit when the battery carries the load, the other is in circuit when the generator carries the load, and both are in circuit when the battery is being charged or the electro-magnetic machine is operating as a motor to start the engine.

In connection with the solenoid coils F and G I employ a circuit closing member operating in a branch circuit and controlling the rheostat and certain other parts of the system. This circuit closing member is shown as a tilting member 20 having an arm 21 connected to the core or cores of the solenoid coils F and G. Adjacent to this member are a pair of stops 22 and 23 limiting the tilting movement of the member 20. Acting in opposition to the magnetic pull of the solenoid cores is a coil spring 24 which normally holds the member in engagement with the stop 22. For limiting the speed of movement of the member 20 and preventing its instantaneous return under the action of the spring 24 when the solenoid coil circuit is interrupted or drops to zero, I provide a dash-pot 25. This and the spring 24 are shown as connected to an arm 26 projecting from the member 20 in the opposite direction to the arm 21.

The member 20 is electrically connected to the positive sides of the battery D and generator B at all times, the connection being shown as a wire 27 including a solenoid coil 28 connected to the wire 16 between the rheostat 15 and the switch H.

The member 20 presents a cam surface 29 of such form that when in normal position, as shown in the drawing, it is out of engagement with a contact spring 30. As the member 20 is pulled over or rocked clockwise by the solenoids F or G, or both, the spring contact 30 comes into engagement with the cam surface 29 of the member 20 and a circuit is closed from the electrically positive member 20 through spring contact 30, wire 31, hand switch 32, wire 33, automatic switch 34, and wire 35 to wire 13 and the negative side of the battery. Thus a sufficient flow of current through coil F or G, or both, operates to close the circuit between the member 20 and the spring contact 30, energizes the solenoid coil 28, operates the rheostat and closes the battery circuit through the electro-magnetic machine B. The latter now operates as a motor to crank the engine. The operation of the rheostat and of the core of the solenoid 28 is retarded by an upwardly acting dash-pot 37.

The movement of the core of the coil 28 and the arm of the rheostat also serves to control the ignition circuit of the motor. As shown somewhat diagrammatically, one of the moving parts, for instance the core of the solenoid 28, carries a switch member 38 in the engine ignition circuit. I do not wish to be limited to any particular type of ignition but merely for purposes of illustration have indicated a magneto 39 with the switch 38 in a ground wire 40 of the magneto. Thus as soon as the coil 28 operates the rheostat to deliver starting current to the motor B, the ground circuit of the magneto will be broken and the engine ignition put into operation.

The solenoid 28 is also illustrated as operating a small switch 41 in the wire 27. The wire includes a resistance coil 42 normally out of circuit and permitting free initial flow of current to the solenoid coil 28 but as the member 38 is moved upwardly it operates the switch member 41 to throw in the resistance 42 and cut down the full flow to the solenoid. The circuit is never broken by the switch 41 as the direct connection is not closed until after the resistance is cut in. The operation of the member 20 by the solenoids F or G, or both, also operates to control another branch to prevent depletion of the battery on very light load on the battery. As shown, a wire 43 is connected to the wire 31 and thus to the negative side of the battery as above described. This wire 43 is connected to a switch member 44 which is operated by a spring arm 45 connected to the arm 26 of the member 20 but insulated from the latter. This switch 44 is normally open but is so positioned that it will close before spring contact 30 and upon a comparatively slight movement of the member 20 and thus on a comparatively light load circuit through coil F. The switch 44, when operated, closes a circuit through a wire 46 to a lamp 47 enclosed in a casing K. From the lamp it flows to a normally closed switch 48 connected to the wire 16. The switch is so positioned that it may be controlled in part by the action of the core 49 of the shunt coil 60 as hereinafter set forth.

The lamp 47, enclosed in casing K, operates as a heater and might be replaced by any other suitable electric heating device. Within the casing there is a thermostatic circuit closer 50, one terminal of which is connected by a wire 51 to the wire 33 through switch 32, wire 33, switch 34 to negative wire 13. The opposite terminal of the thermostatic circuit closer 50 is connected by wires 61 and 27 to coil 28. Thus when the lamp 47 burns for some time on very light load, it causes closing of the thermostatic circuit closer. In case a sufficient load is turned on to move the member 20 a sufficient distance to close the circuit through the spring contact 30, the solenoid coil 28 will be energized, the rheostat closed and the engine cranked by the battery.

It will be noted that the current for both the heating lamp 47 and the current for the solenoid coil 54 comes from the positive side of the battery through the switch 48.

In addition to the series coil 17 there is a shunt coil 60 encircling the solenoid core 49. These two coils may be arranged concentric with the coil 17 on the outside if desired and, in fact, that is the preferable arrangement. The coil 60 has one end connected to the positive wire 16 of the battery below the switch 48 and its opposite end is connected by a wire to member 20. When 20—30 closes, or thermostatic switch 50 closes, or hand switch 32 closes, current flows through 60, to negative 27 or 61, as the case may be. In this wire there is preferably provided a small 8 candle power 120 volt carbon lamp acting to cut down the voltage that can pass through this coil. The spring 59 normally holds the switch 48 closed. The tension of the spring is such that it requires certain voltage through the shunt coil 60 to overcome the tension of the spring and open the switch 48. When the battery current starts motoring the electro-magnetic machine, there is a heavy rush of current through the series coil 17 which neutralizes the effect of the shunt coil and keeps the switch 48 closed. Directly the engine fires and the electro-magnetic machine begins acting as a generator, the voltage in the shunt coil 60 rises to the required voltage and the heavy current in the series coil is reduced and the shunt coil acts on the core against the spring 59 to open the switch 48. In case of an overload and the attendant rush of current through the series coil and the drop in voltage, the same closing of the switch 48 would result. The closing of the switch 48 energizes the solenoid 54 from the positive side of the battery and if of long enough duration opens switch 34 and cuts negative current off 28, stopping plant.

As a precaution against the depleting of the battery by continuous motoring of the electro-magnetic machine, in case said machine should fail to function through bad ignition or lack of fuel, a mechanism is provided that will open the circuit to the solenoid 28 of the rheostat and cause the rheostat to open and stop the flow of battery current to the motor. This operates as follows. It will be noted that the solenoid coil 28 of the rheostat is connected to the positive side of the battery through wires 27ᴬ and 16 and is connected to the negative side of the battery through wires 27, circuit closer 20, spring contact 30, and thence through switches 32 and 34. If the motor fails to start the switch 48 will remain closed and thus energize the coil 54. This will open the switch 34 and prevent further flow of current through the solenoid 28, and the rheostat 15 will open. The conditions will not be reestablished for attempted restarting until after the switch 34 has been reset by hand.

In case it is desired to start motoring manually and without the automatic mechanism, the switch 32 may be swung over to 180° to the contact 63 which is connected to the wire 53. The current from the battery may flow through the wire 16, including coil 17, then through switch H, wire 27ᴬ, coil 28, wire 27, wire 61, contact 63, switch 32, wire 33, switch 34, and wires 35 and 13 to the negative side of the battery.

Although I have shown ammeters for indicating the battery current and the load current it will, of course, be evident that these do not form any portion of the invention and merely facilitate an inspection of the working conditions of the system. I have also shown a volt meter 65 with one terminal connected to the wire 10 and the other to the wire 13 and thus to the poles of the battery. This volt meter may be left in circuit at all times, if desired, although preferably there is a push button switch 66 which is normally opened and which closes the circuit to permit a reading of the voltage only while the push button is held manually closed. Obviously the volt meter might be omitted, if desired.

I have shown the two coils F and G as separate elements and with their separate cores rigidly connected. It will, of course, be evident that the coils of these two solenoids might be formed as a single coil and with a single core and the wire 12 connected intermediate of the ends of the coil.

Having thus described my invention what I claim as new and desire to secure by Letters Patent is:

1. In an automatic electric generating system, the combination with an internal combustion engine, an electro-magnetic machine adapted to serve as a generator when driven by the engine or as a motor for starting the engine, a storage battery, a load, and circuits connecting the battery, electro-magnetic machine and load, of a solenoid including a coil at all times in the main battery charging and discharging circuit, and a controller in the connection between the battery and electro-magnetic machine and controlled by the movement of the armature of said solenoid.

2. An automatic electric generating system of the type in which battery current may operate an electro-magnetic machine to start an internal combustion engine when a predetermined load is put on the battery and in which the engine when started may drive the electro-magnetic machine to generate current for carrying the load or charging the battery, distinguished by a solenoid coil in series with the battery during battery charging or engine starting operations, said coil having a core movable to control the circuit connecting the battery and electro-magnetic machine.

3. An automatic electric generating system of the type in which battery current may operate an electro-magnetic machine to start an internal combustion engine when a predetermined load is put on the battery and in which the engine when started may drive the electro-magnetic machine to generate current for carrying the load or charging the battery, distinguished by a solenoid coil in series with the battery during battery charging or engine starting operations, said coil having a core movable to control the branch circuit of a solenoid operating a rheostat in the circuit of the electro-magnetic machine.

4. In an automatic electric generating system, the combination with an internal combustion engine, an electro-magnetic machine adapted to serve as a generator when driven by the engine or as a motor for starting the engine, a storage battery, a load, and circuits connecting the battery, electro-magnetic machine and load, of a solenoid including a coil at all times in series with the battery, a controller in the connection between the battery and electro-magnetic machine and controlled by the movement of said solenoid, and a branch circuit closed by said controller upon a light load and including a heating device and a thermostatic circuit controller.

5. In an automatic electric generating system, the combination with an internal combustion engine, an electro-magnetic machine adapted to serve as a generator when driven by the engine or as a motor for starting the engine, a storage battery, a load, and circuits connecting the battery, electro-magnetic machine and load, of a solenoid including a coil at all times in series with the battery, and a controller in the connection between the battery and electro-magnetic machine and controlled by the movement of the armature of said solenoid, said controller operating upon a comparatively light load to close a branch circuit starting the motor after predetermined delay and operating upon a heavier current to effect the immediate starting of the motor.

6. In an automatic electric generating system, the combination with an internal combustion engine, an electro-magnetic machine adapted to serve as a generator when driven by the engine or as a motor for starting the engine, a storage battery, a load, and circuits connecting the battery, electro-magnetic machine and load, of a solenoid including a pair of coils, one at all times in circuit with the battery and the other at all times in circuit with the electro-magnetic machine, and a rheostat in the connection between the battery and the electro-magnetic machine and controlled by the movement of the solenoid when either of said coils is energized.

Signed at New York city, in the county of New York and State of New York, this 23rd day of July A. D. 1920.

HOWARD FIELD CARPENTER.